June 14, 1932. A. W. PHELPS ET AL 1,863,314
ASSEMBLING APPARATUS
Filed March 6, 1930 10 Sheets-Sheet 3
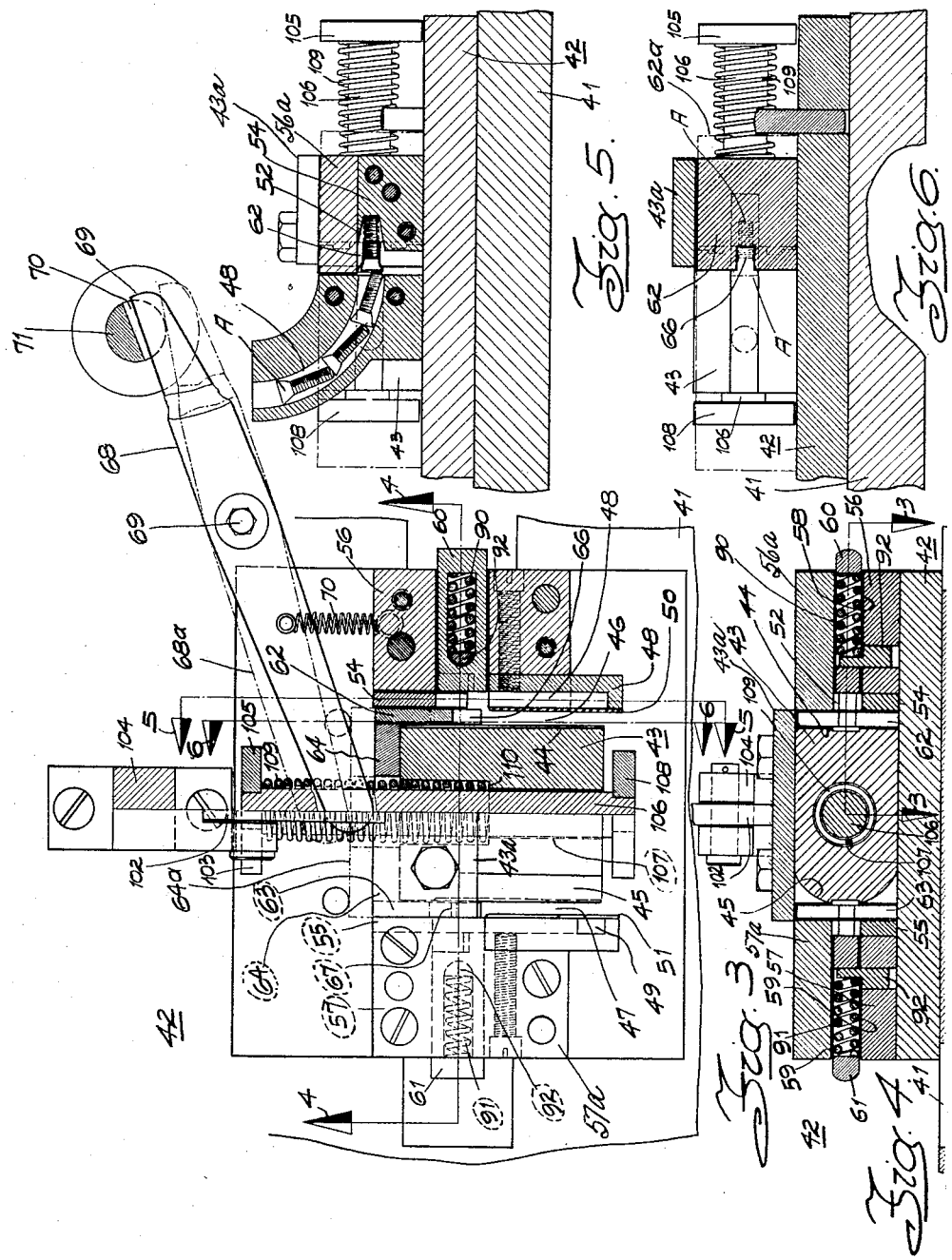
Inventors
Alva W. Phelps
and Norman L. Penn
by Spencer Hardman and Fehr
their attorneys

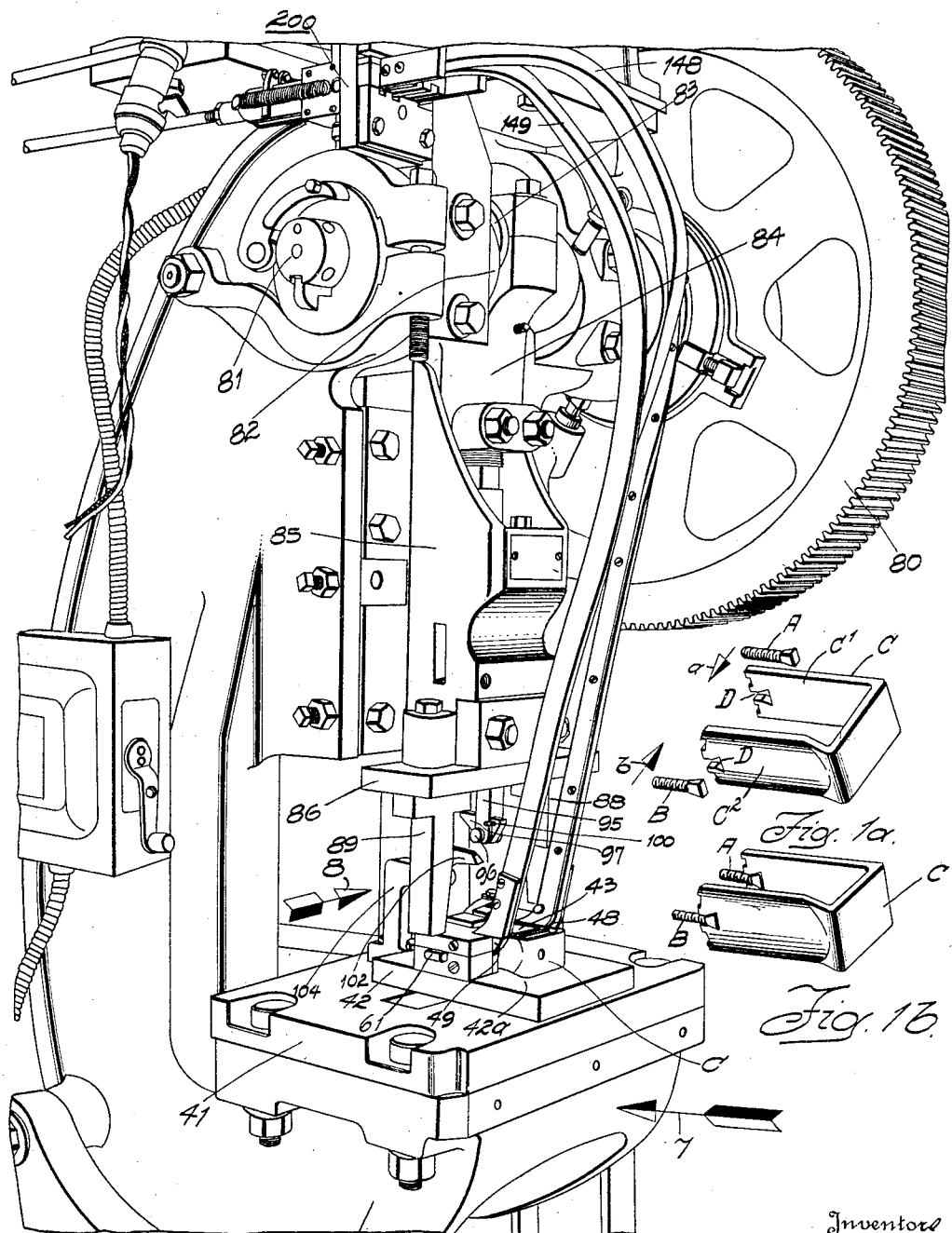

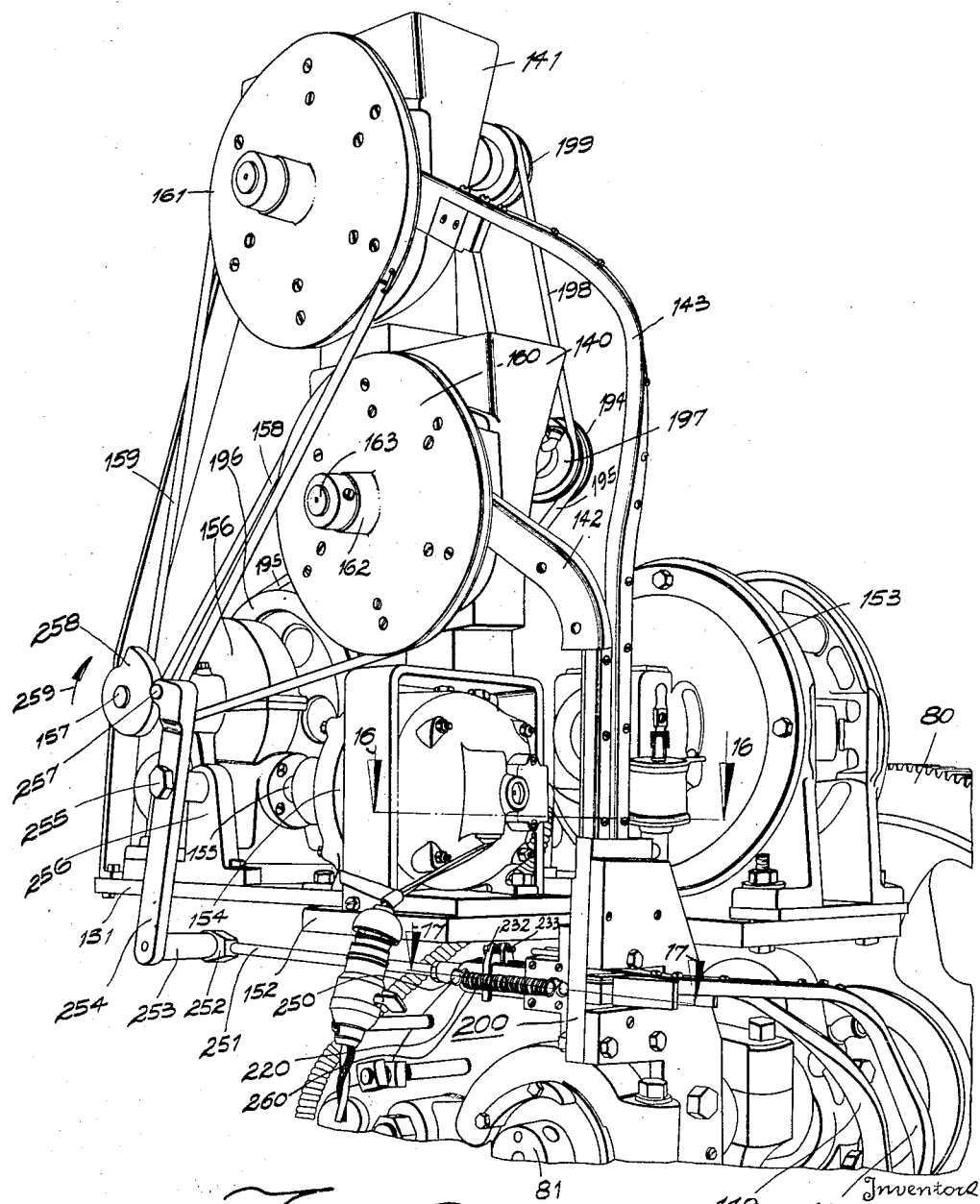

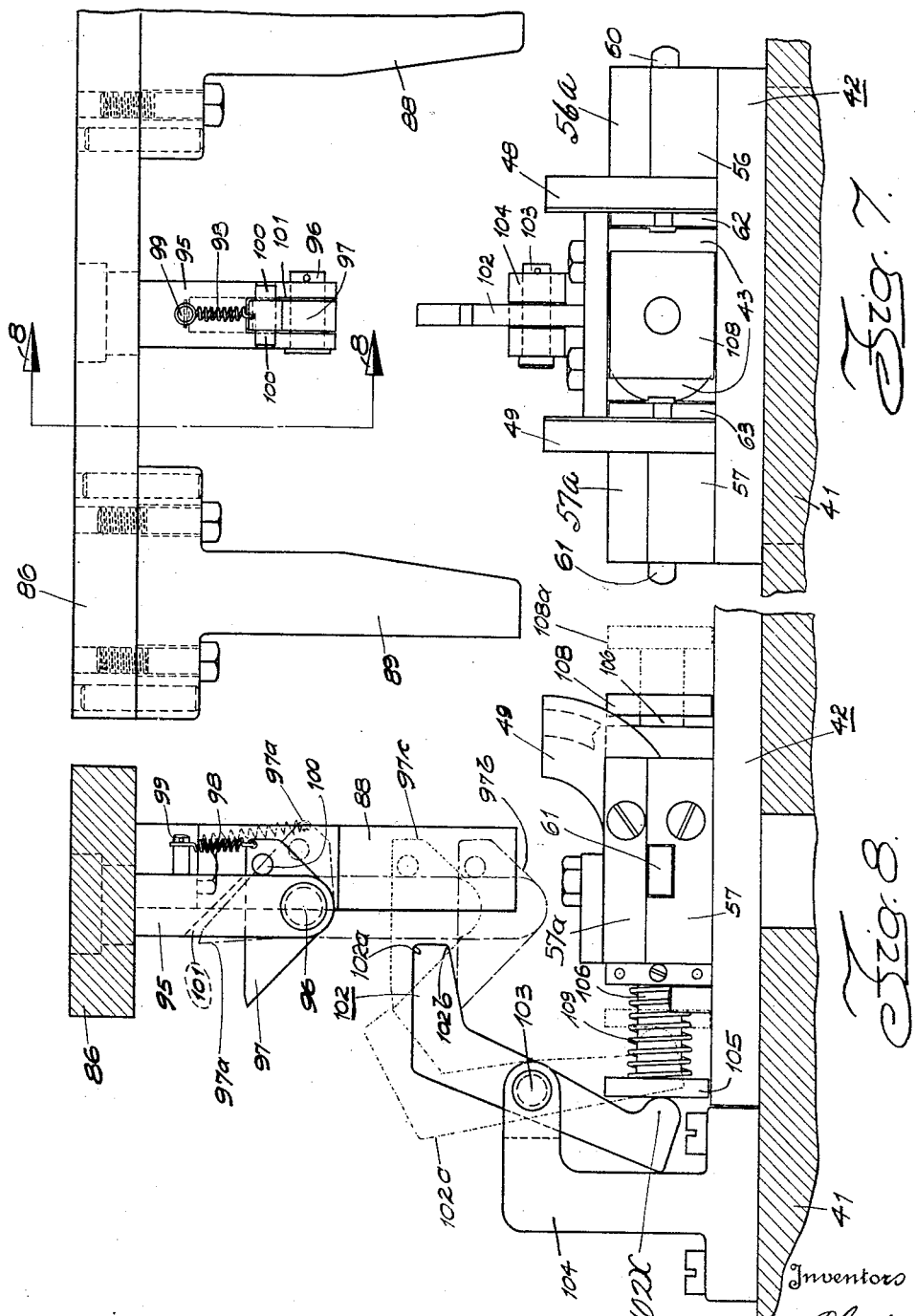

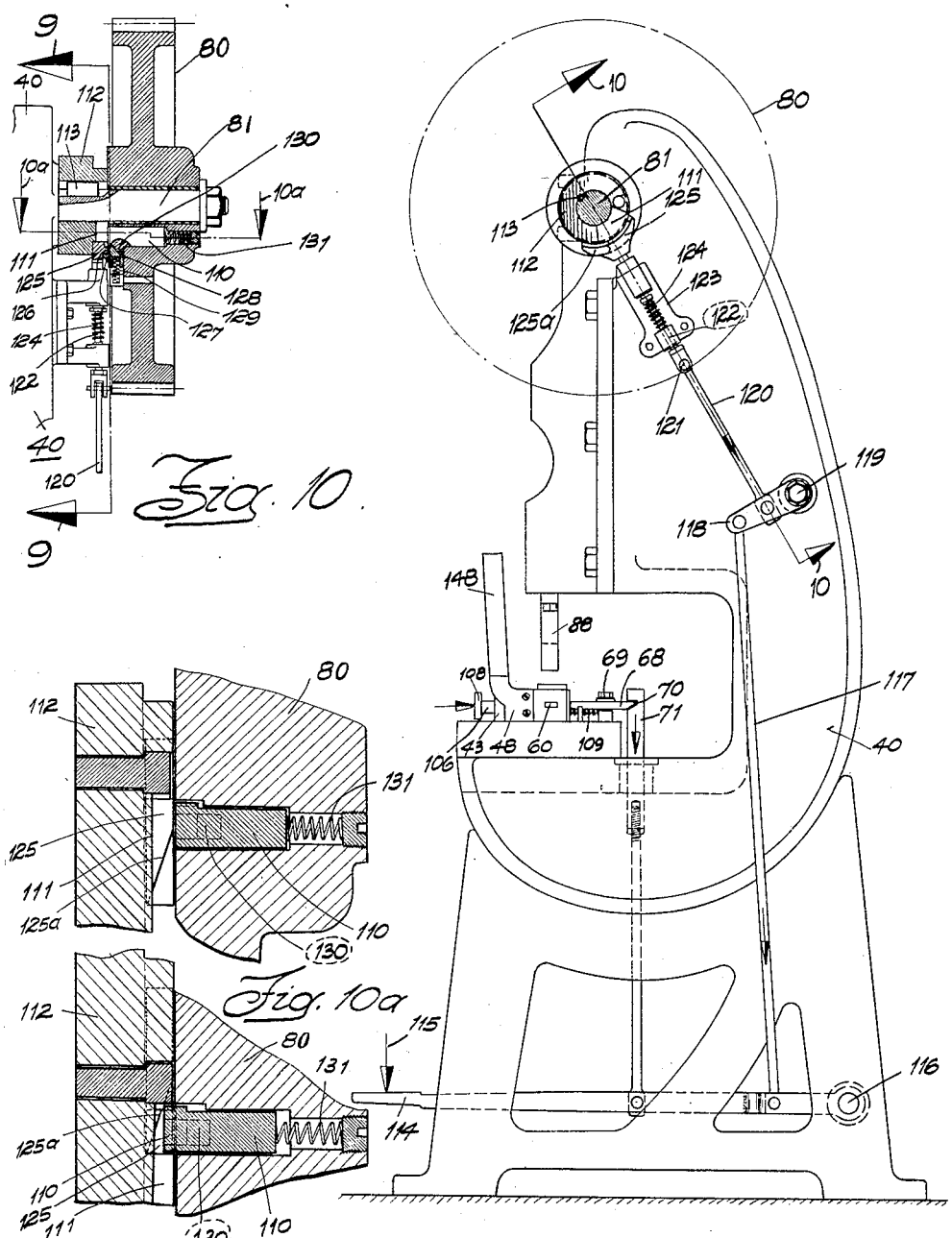

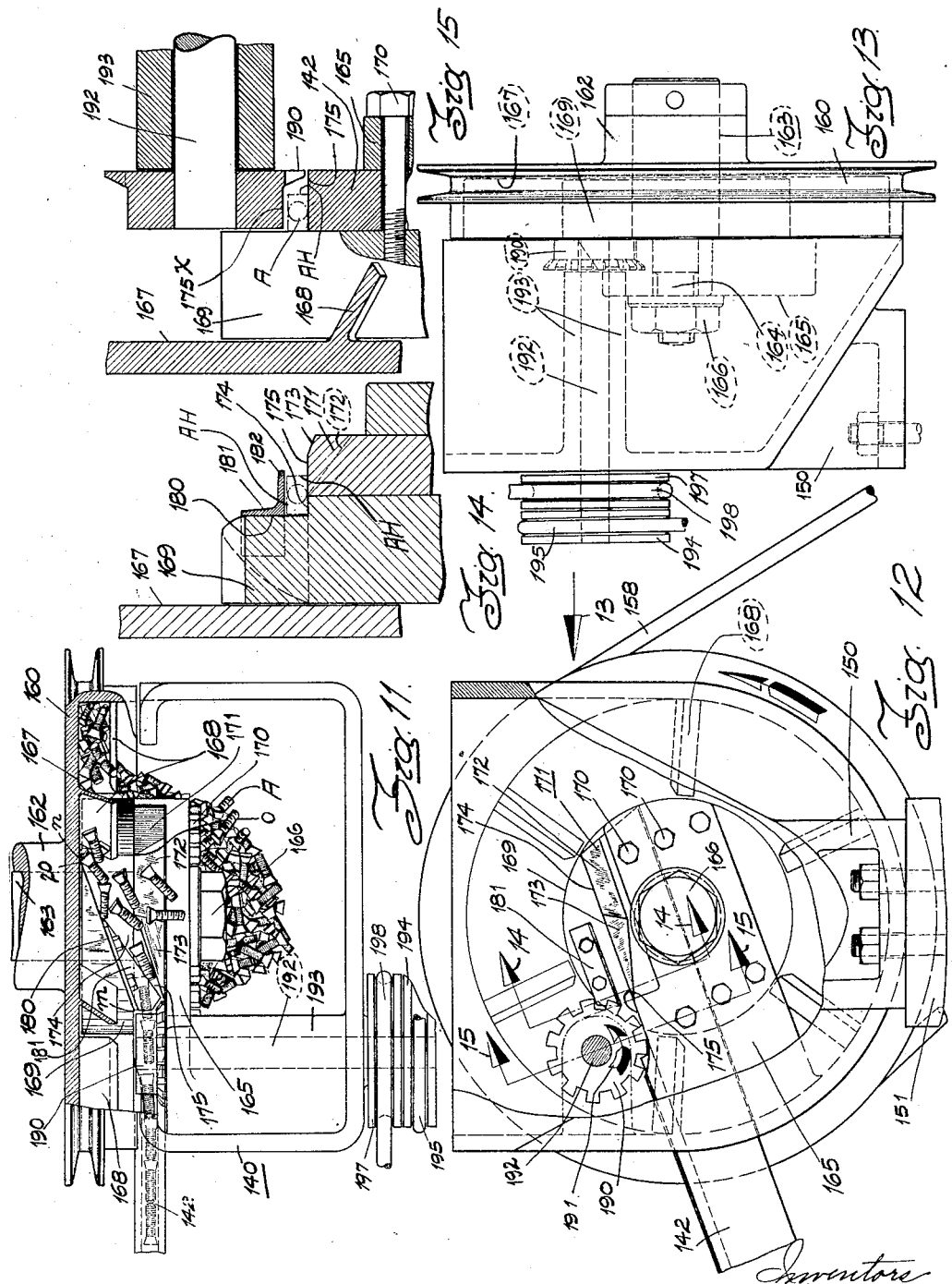

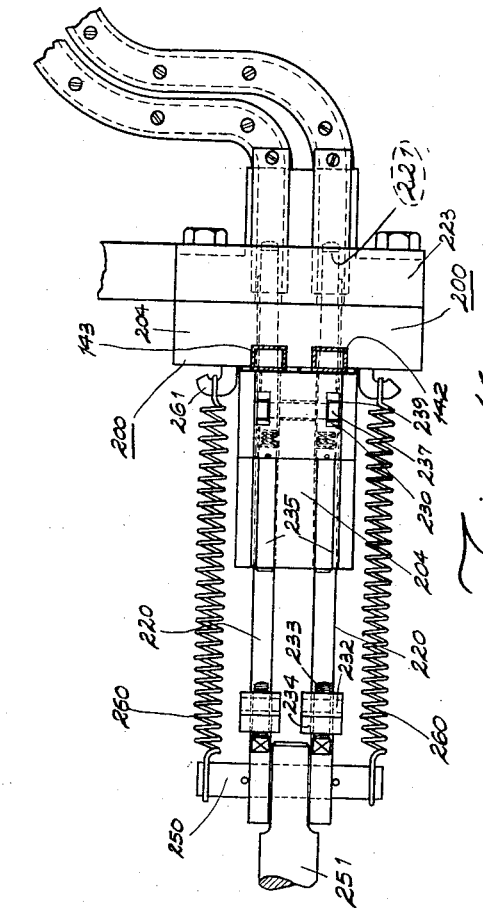
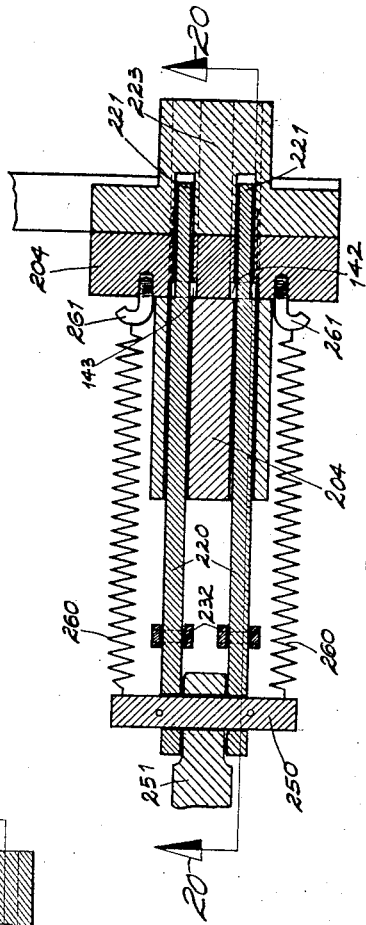
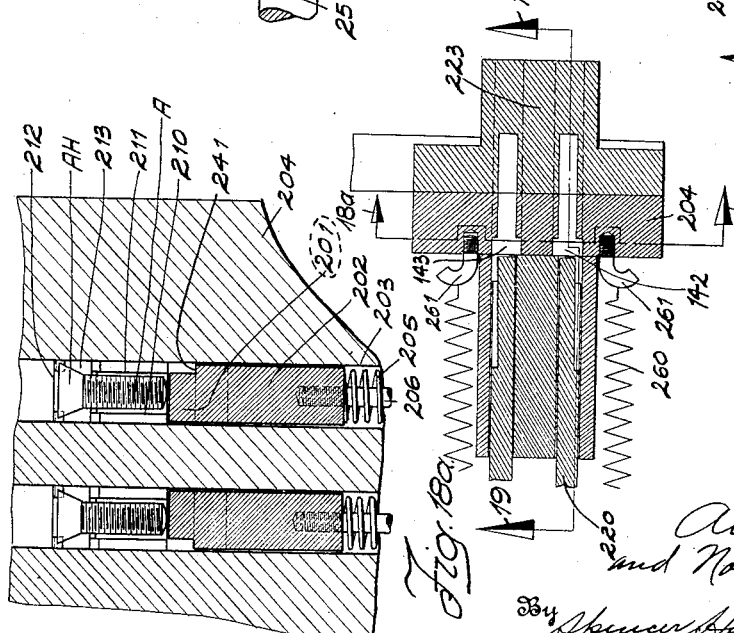

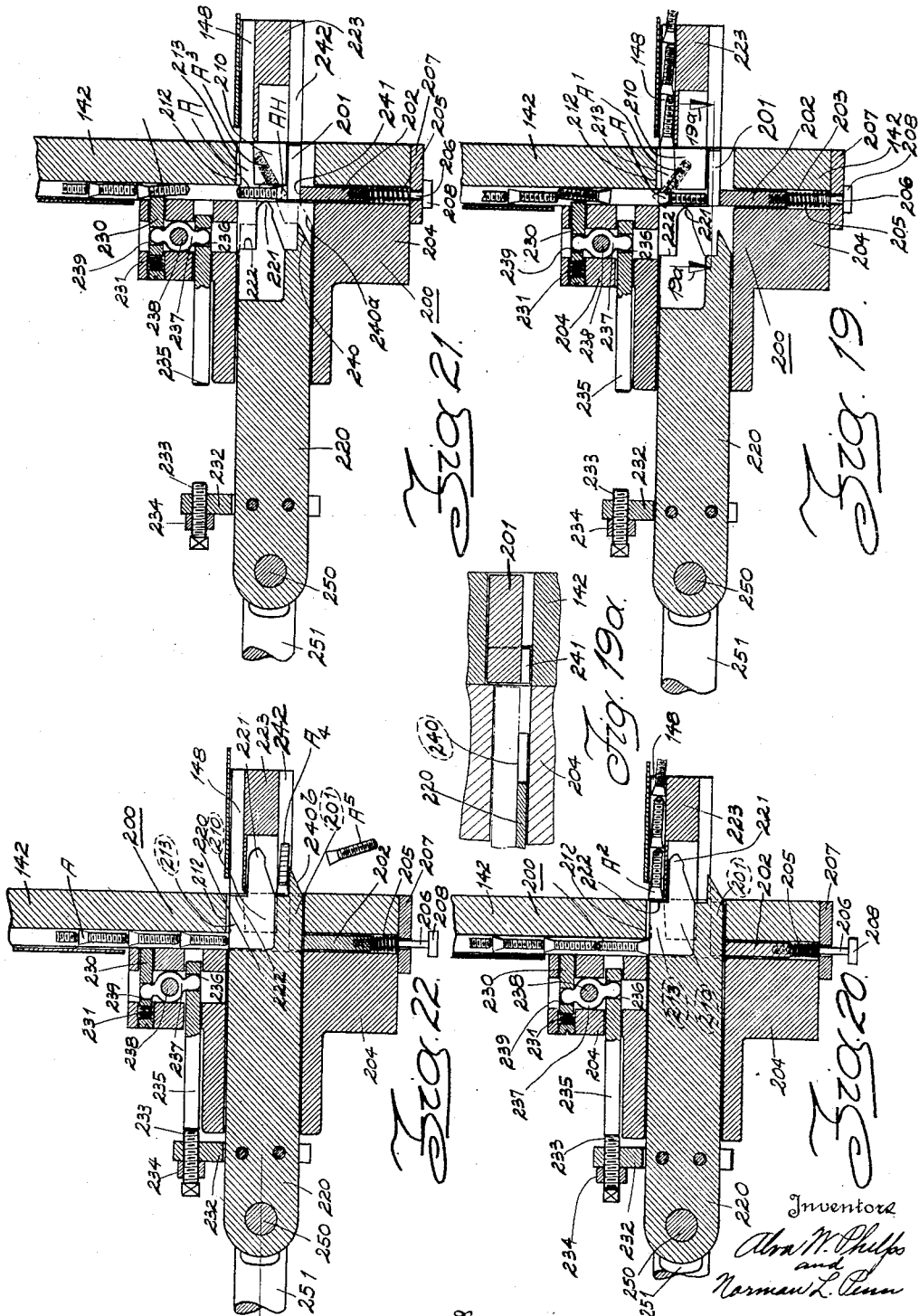

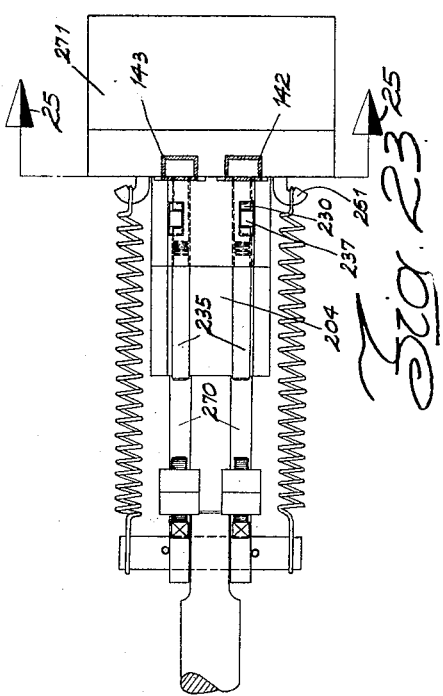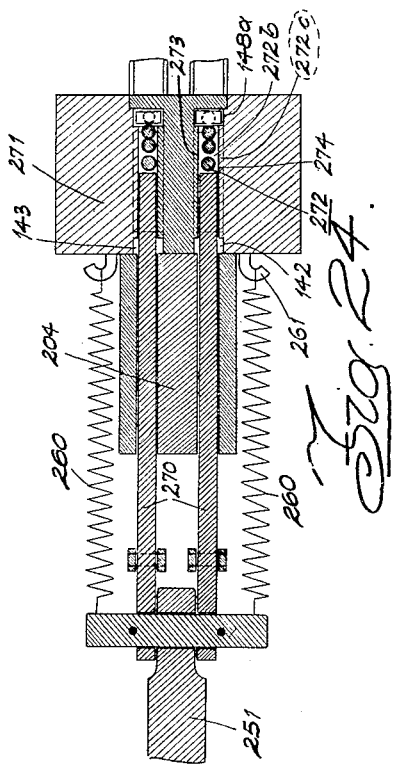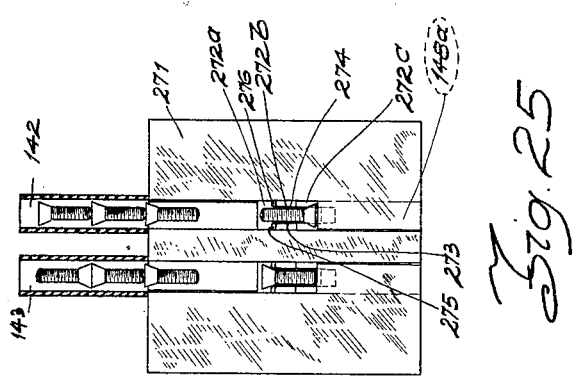

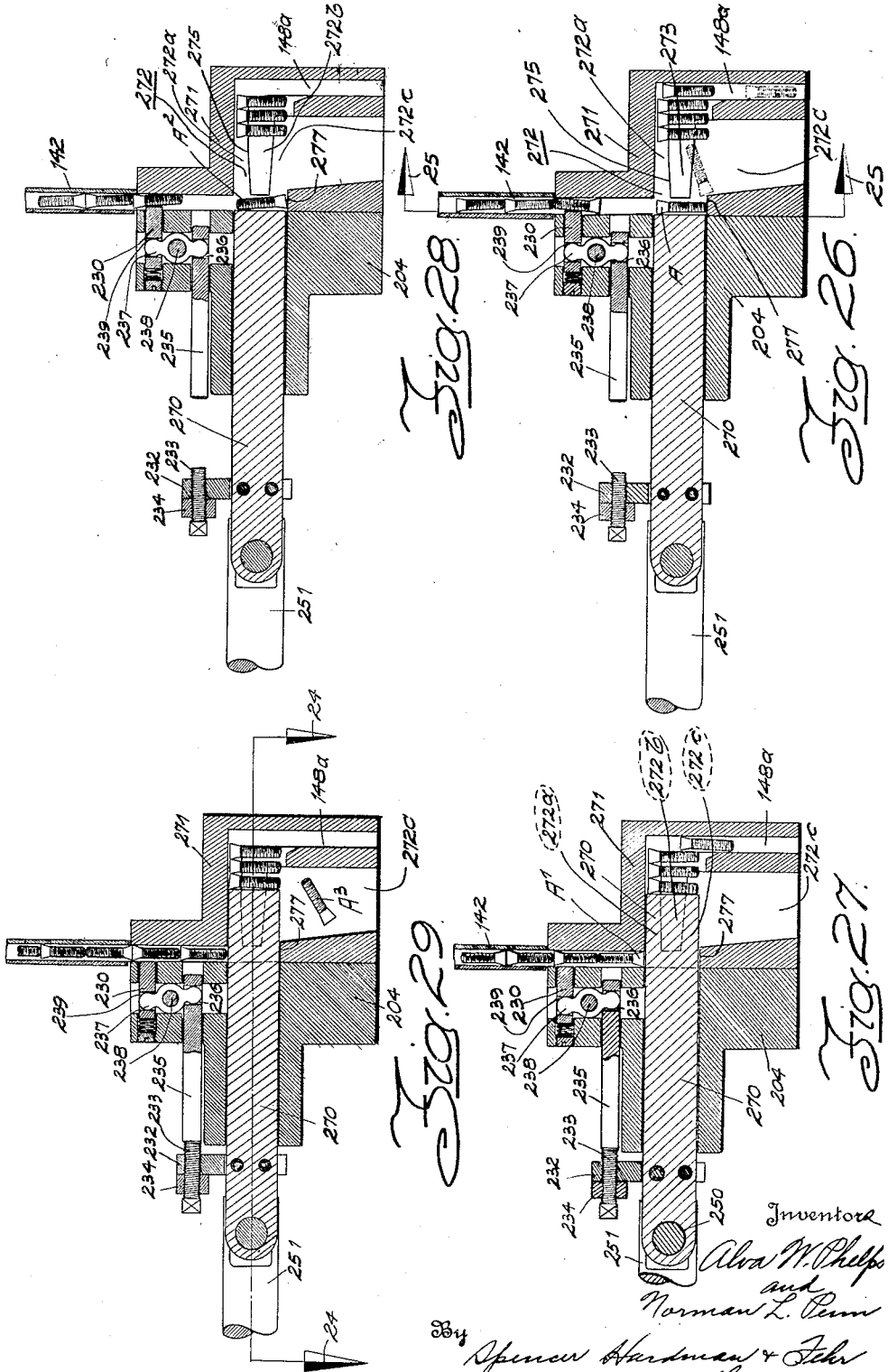

Patented June 14, 1932

1,863,314

UNITED STATES PATENT OFFICE

ALVA W. PHELPS AND NORMAN L. PENN, OF ANDERSON, INDIANA, ASSIGNORS TO DELCO-REMY CORPORATION, OF ANDERSON, INDIANA, A CORPORATION OF DELAWARE

ASSEMBLING APPARATUS

Application filed March 6, 1930. Serial No. 433,677.

This invention relates to the art of assembling fastening devices, such as screws, with parts to be assembled, and particularly with parts, each having a recess provided near one edge thereof for receiving the head of a screw, which is passed into the recess by sidewise movement of the screw, thus leaving the threaded portion of the screw projecting beyond the part to provide a threaded projection by which the part may be assembled with another part having a hole for receiving the screw. The screw receives a nut by which the parts may be secured rigidly together by tightening the nut on the screw.

It is an object of the present invention to provide power means for assembling screws and parts, and to provide means for automatically feeding the screws from a hopper to a device which pushes the screws laterally so that a screw head will be forced into the screw head receiving recess of the part to which the screw is to be attached. The disclosed embodiment of the present invention is particularly adapted for attaching a screw to each leg of a U-shaped bracket adapted to be used as a field frame of a small electric motor, for example, a motor used to operate an automobile horn such as shown in the copending application of R. M. Critchfield, Serial No. 112,268 filed May 28, 1926. Each leg of the frame is provided with a notch adjacent the edge thereof. Each notch is dovetail in contour and receives a similarly shaped head of a screw, the head being slightly greater in dimensions than the dimension of the notch requiring that the screw head be press-fitted into the recess of the frame. It is desirable that the threaded shank of the screw be about equal in diameter to the thickness of the sheet metal part to which it is attached. It is, therefore, desirable that the head of the screw have a thickness (dimension taken at right angles to the dove-tail shaped face fitting the recess in the frame) which is substantially equal to the thickness of the head of the frame which receives the screw. In order that the screws will be fed in only one manner, to the frame into which the head of the screw is inserted, the present invention provides an automatic screw feeding apparatus having devices which will permit screws to pass from a screw containing hopper through a gate which permits the screw to slide flatwise only, into a chute which delivers the screw to a second gate or device for passing only such screws as point in a certain manner, for example, the second gate may pass only the screws whose threaded shanks point downwardly as they descend from the hopper to the second gate. Those screws which point upwardly are automatically removed from the feeding mechanism so that the chute which finally delivers the screw to the power operated device for assembling it with the bracket or frame, contains only screws which point in a certain direction and which are so located that the flat sides of the screws are substantially in the same plane where they enter the assembling device.

Another object of the present invention is to provide a safety device for preventing operation of the power operated assembling device unless the frame to be assembled with the screw is located in proper position for receiving the screw.

Further objects and advantages of the present invention will be apparent from the following description, reference being had to the accompanying drawings wherein a preferred embodiment of one form of the present invention is clearly shown.

In the drawings:

Fig. 1 is a fragmentary, perspective view of the lower part of the machine embodying the present invention showing the power operated device for assembling simultaneously a screw with each leg of a U-shaped frame.

Fig. 1a is a perspective view of the U-shaped frame before assembling screws therewith, the screws also being shown in perspective.

Fig. 1b is a perspective view of the frame with screws assembled.

Fig. 2 is a perspective view of the upper portion of the machine showing the devices for automatically feeding screws from two separate hoppers into separate chutes through which screws are delivered in the proper manner to the assembling device shown in Fig. 1.

Fig. 3 is a plan view, partly in section, of that portion of the assembling device which rests upon a stationary support, the part shown in section being a sectional view on the line 3—3 of Fig. 4.

Figs. 4, 5, and 6 are fragmentary sectional views taken respectively on the lines 4—4, 5—5 and 6—6 of Fig. 3.

Fig. 7 is a fragmentary front view of the assembling device looking in the direction of the arrow 7 of Fig. 1.

Fig. 8 is a side view thereof partly in section, the section being taken on the line 8—8 of Fig. 7.

Fig. 9 is a diagrammatic right side elevation of the machine showing only that part which relates to the safety device for preventing operation of the power assembling device in case the U-shaped bracket is not in proper position. That part of Fig. 9 shown in section is taken on the section line 9—9 of Fig. 10.

Fig. 10 is a sectional view on the line 10—10 of Fig. 9.

Figs. 10a and 10b are fragmentary sectional views on line 10a—10a of Fig. 10 and show the clutch parts in different positions. These views are drawn to a larger scale than Fig. 10.

Fig. 11 is a plan view, partly broken away, of one of the hoppers from which screws are fed automatically to the assembling device.

Fig. 12 is a front elevation thereof, partly broken away.

Fig. 13 is a side view looking in the direction of the arrow 13 of Fig. 12.

Figs. 14 and 15 are sectional views taken respectively on the lines 14—14 and 15—15 of Fig. 12.

Fig. 16 is a plan view of the device which automatically passes only such screws as descend from the hopper with the threaded shanks pointing down and ejects those which descend head first. This view is partly in section taken on the line 16—16 of Fig. 2.

Fig. 17 is a sectional view on the line 17—17 of Fig. 2.

Fig. 18 is a fragmentary sectional view similar to Fig. 17, showing certain movable parts in another position.

Fig. 18a is a sectional view on the line 18a—18a of Fig. 18.

Fig. 19 is a sectional view on the line 19—19 of Fig. 18 showing a screw which has descended point first into the position for passing the second gate into a chute through which the screw must descend point first only.

Fig. 19a is a fragmentary sectional view on line 19a—19a of Fig. 19.

Fig. 20 is a sectional view on line 20—20 of Fig. 17 and shows how the screw mentioned in the preceding paragraph is caused to be delivered point first into the outlet chute.

Fig. 21 is a view similar to Fig. 19, showing a screw that has descended head first from the inlet chute.

Fig. 22 is a view similar to Fig. 20, showing how the screw which descended head first in Fig. 21, is ejected from the feeding apparatus.

Figs. 23 and 24 are views similar to Figs. 16 and 17 respectively, showing a modified form of apparatus for passing only such screws as point in a certain direction.

Fig. 24 is a sectional view on line 24—24 of Fig. 29.

Fig. 25 is a sectional view on line 25—25 of Fig. 23, or line 25—25 of Fig. 26.

Figs. 26, 27, 28 and 29 are views similar in description to Figs. 19, 20, 21 and 22 respectively, and show the mode of operation of the modified form of feeding device as shown in Figs. 23, 24 and 25.

Referring to Fig. 1a the operations performed by the machine shown in Figs. 1 and 2 are that of assembling screws A and B with the branches of a U-shaped frame C having in each branch a notch D adapted to receive a head of a screw, the screw head being press-fitted into the notches D by moving the screws A and B respectively, in the direction of the arrows a and b. Fig. 1b shows the screws A and B assembled with the frame C.

*Screw and frame assembling apparatus*

The apparatus for assembling the screws A and B with the frame C is operated by a punch press 40, having a base plate 41, to which a work holder 42 is attached in any suitable manner. Referring to Figs. 3 to 8, the work holder 42 comprises a center block 43 about which the frame C is positioned, as shown in Fig. 1. It will be noted that one branch $C^1$ of the frame C is flat and the other branch of the frame $C^2$ is cylindrical. Hence, the center block is provided with a plane surface 44 adjacent which the leg $C^1$ is placed, and the block 43 has a cylindrical surface 45 adjacent to which the leg $C^2$ is placed. Block 43 is covered partly by a plate 43a. Referring to Fig. 3, it will be seen that the space 46 immediately adjacent the surface 44 is adapted to receive the leg $C^1$ and the space 47 adjacent the surface 45 is adapted to receive the leg $C^2$. The screws A and B are caused to descend chutes, to be described later, terminating in screw receiving pocket members 48 and 49 having covers 50 and 51 respectively. Referring to Fig. 5, it will be seen that the lower most screw A has its point received by notch 52, in a block 54, which serves to locate the screw in proper position so that its head will be in alignment with the notch D of the leg $C^1$ when the U-shaped frame is in proper position. The lower most screw B is located by a similar notch block 55. The blocks 54 and 55 are attached to brackets 56 and 57 respectively, having rectangular notches 58 and 59 for receiving slides 60 and 61 respectively. Plates 56a and 57a cover the blocks 56 and 57 respectively with their notches 58 and 59 and the slides 60 and 61. Each slide 60 and 61 is adapted to move through the notches of the blocks 54 and 55 respectively, in order to move the screws A and B respectively, into the notches of the frame legs $C^1$ and $C^2$, respectively, when these legs are received by the spaces 46 and 47. This action, however, cannot take place until the frame C has been located as shown in Fig. 1 and has been pushed along the base block 42a of the work holder 42 sufficiently to cause the frame legs $C^1$ and $C^2$ to engage respectively, the legs 62 and 63 of a U-shaped frame having a yoke 64 and to cause said frame to move until its yoke is in the position shown at 64a in dot-and-dash lines in Fig. 3. When this occurs, the legs 62 and 63 will have moved sufficiently so that their notches 66 and 67 respectively, will have been moved into alignment with the screw point receiving notches of the blocks 54 and 55 out of alignment with the heads of the screws in order to permit the screws to be moved laterally. Fig. 6 shows the leg 62 with its notch 66 in normal position. One of the screws A is shown in dot-and-dash lines. It will be seen that normally the leg 62 provides a gate obstructing the movement laterally of the screw A until the gate has been moved into position 62a in Fig. 6 indicated by dot-and-dash lines. Now when the gate has been moved by the work piece C so that its yoke 64 has arrived at the position 64a, a clutch control latch out lever 68 pivoted at 69, will be moved against the action of the spring 70 from the full line position shown in Fig. 3 into the dot-dash line position 68a whereupon the end 69 of the lever 68 will be retracted from a notch 70 in a vertically movable bar attached to the clutch control pedal to be described.

The power driven fly-wheel 80 of the punch press is loosely journalled on the punch press shaft 81, which is journalled in bearing 82 and has a crank 83 connected by a crank rod 84 with a vertically reciprocating head 85 carrying a plate 86 to which cams 88 and 89 are attached. During downward movement of the head 85 the cams 88 and 89 engage the outer ends of the slides 60 and 61 respectively, in order to cause them to move simultaneously toward the center block 43 and press fittingly to force the heads of the screws A and B respectively, into the notches of the legs $C^1$ and $C^2$. During upward movement of the head 85, the slides 60 and 61 are permitted to return to normal position by springs 90 and 91 respectively, each located in an elongated hole in a slide and bearing at one end against the outer end portion of the slide and at the other end against the stationary lug 92 secured to the slide supporting block. As soon as the slides have returned to normal position, the screws will descend through the screw pocket so that the lower most screw will be received by a screw receiving block 54, 55 ready for the next operation.

The assembly of frame and screws shown in Fig. 1b is automatically ejected from the work holder by a mechanism operated by the upward movement of the head 85. The plate 86 attached to the head 85, carries a bifurcated bracket 95 pivotally supporting at 96 a latch 97 urged in a counterclockwise direction as viewed in Fig. 8 by spring 98 having its end attached respectively to the latch 97 and a stud 99 attached to the bracket 95. The ends of a pin 100 project beyond the sides of the latch 97 which is only slightly less in thickness than the notch 101 which receives the latch, hence the pin 100 operates to limit rotation of the latch 97 into the position shown in full lines in Fig. 8. The latch 97 cooperates with an ejector lever 102 pivoted at 103 upon a bracket 104 attached to the base plate 41. The lower end 102x of the lever 102 is adapted to engage the head 105 of an ejector rod 106, which slides through an opening 107 in the center block 43 and which is attached at its front end to an ejector pad 108 adjacent which the yoke of the frame C is located when properly positioned in the work holder, as shown in Fig. 1. A spring 109, located between the head 105 and the shoulder 110 provided by the center block 43, operates to hold the ejector rod in normal position as shown in full lines in Figs. 3 and 8. When the plate 86 descends, the latch 97 will strike the lever 102 at the point 102a, thereby tending to move the lever 102 clockwise as viewed in Fig. 8. Since this motion cannot take place on account of the bracket 104, the latch 97 will be cammed into a relative position shown at 97a, so that the latch 97 may clear the lever 102 and finally be returned to normal position by the spring 98 when the latch has cleared the point 102b of the lever 102. During upward movement of the plate 86, the latch 97 comes into a position 97b shown in Fig. 8 into which it begins to lift the upper end of the lever 102 and finally causes the lever to move into the position 102c by the time the latch has arrived at the position 97c. Thus, by moving the lever 102 counterclockwise, the ejector pad is caused to move toward the right into position 180a shown in Fig. 8, in order to eject the assembled work from the work holder. The work having been removed, the spring 70 is permitted to return the lever 68 into position for entering the notch 70 of the rod 71 at the time that the throwing out of the clutch takes place and the machine comes to rest. As the branches of the frame C fit their respective recesses in the work holder somewhat snugly, it is not necessary to hold the frame C in the work holder during the assembling operation there being sufficient friction between the branches of the frame and the side walls of the center block 43 to overcome the spring 70 so that the lever 68 will occupy the position 68a without requiring the operator to push the work toward the center block during the screw assembling operation.

Referring to Figs. 9, 10, 10a and 10b, the clutch control will now be described. The power fly-wheel 80 is connected with the crank shaft 81 of the punch press by a clutch comprising a pin 110 to enter a notch 111 in a clutch collar 112 attached by key 113 to the shaft 81. This is accomplished by pressing a lever 114 in the direction of the arrow 115. The lever 114 being pivoted at 116, causes a link 117 to move downwardly and produce a corresponding downward movement of a lever 118 pivoted at 119 to which link 117 is connected and downward movement of a rod 120 connected with rod 118 and pivotally connected at 121 with a rod 122 slidable in a bracket 123 and urged upwardly by spring 124. The upper end of the rod carries a clutch pin throughout cam 125 having a lug 126 adapted to engage a lug 127 of a clutch pin retaining latch 128 urged toward the shaft 81 by spring 129. The latch 128 is radially slidable in a suitable radial notch provided by the hub of the fly-wheel 81. When the rod 122 is moved downwardly, and the cam 125 likewise, the latch 128 is moved away from the shaft 81 and a lug 130 of the pin 110 in order to permit a spring 131 to move the pin 110 into the recess 111. The operator will release the pedal 114 a short interval after the clutch has been disengaged and certainly before the end of one revolution of the shaft 81 in order to prevent a repeat operation upon the same piece of work. As soon as pin 110 is urged by spring 131 to move into the recess 111 of the clutch collar 112, pin 110 engages a hardened steel pin in the clutch collar 112 and thus takes the clutch collar and also shaft 81 for one revolution as the latter is fastened to the crank shaft 81 by key 113. The pedal being released, the spring 124 will return the cam 125 to normal position whereupon its camming edge 125a will engage the left hand end of the pin 110 in order to move it from the position shown in Fig. 10b to that shown in Fig. 10a in which latter position the pin 110 is disengaged from the clutch collar 112 and will be latched in such position by the latch 128 which is returned by the spring 129. It will be understood that this clutch does not per se constitute a part of the present invention, but is explained in conjunction with the safety device for preventing operation of the clutch except when the work is properly located in the work holder. Other types of clutches could be substituted for the one illustrated, for example, a clutch which will not permit of a repeat operation unless the clutch pedal be returned to normal position.

*Automatic screw feeding mechanism—device for passing screws flatwise only*

Referring to Figs. 11 to 15 inclusive, the mechanism for feeding the screws in a certain fashion from a hopper will now be described. Referring to Fig. 2, it will be seen that the machine provides hoppers 140 and 141 from which screws are permitted to pass flatwise only into chutes 142 and 143 respectively, which pass the screws into a selecting device 200 from which only those screws which descend point first through the chutes 142 and 143 are permitted to pass respectively, into chutes 148 and 149, which terminate in the chute pockets 48 and 49. As the devices permitting the screws to pass only flatwise from the hoppers, are alike, only that device associated with hopper 140 will be described. Referring to Figs. 11 to 15, the hopper 140 is mounted on a stand 150 attached to a bracket 151 which in turn is attached to a bracket 152, supporting the motor 153, which drives the fly-wheel gear 80 of the punch press. The bracket 151 supports a small electric motor 154 which drives a shaft 155 connected by reduction gearing in a housing 156 with a shaft 157 carrying pulleys (not shown), which drive belts 158 and 159, which drive the pulleys 160 and 161 respectively, of the hopper feed mechanism of the hoppers 140 and 141 respectively. The pulley 160 has a hub 162 mounted on a stationary shaft 163 having a reduced threaded end 164 projecting through a bracket 165 integral with the hopper 140, and receiving a nut 166 by which the shaft 163 is clamped to the bracket 165. The pulley 160 provides an enclosure for an open side of the hopper 140 through which screws may pass into engagement with the plane circular wall 167 of the pulley and be picked up by the vanes or paddles 168 and be dumped upon a stationary circular disk 169 attached by screws 170 to the bracket 165. Since the hoppers 140 and 141 respectively, contain the screws for feeding the screw pockets 48 and 49 of the work holder, the screws of which have previously been mentioned as screws A and B respectively, the screws in hopper 140 are referred to as screws A and those in hopper 141 as screws B, although these screws are identical. The bracket 165 carries a plate 171 located adjacent the cylindrical part 169 and having downwardly inclined beveled edges 172 and 173. A portion of the cylindrical part 169 is cut away to provide a notch defined by an oblique surface represented by the line m—n of Fig. 11, this surface being oblique to the axis of the pulley and defined by a surface 174, which is in a plane parallel to the axis of the pulley 160 and which is triangular in plan view as viewed in Fig. 11, as designated by the lines m—n, n—o, and o—n in Fig. 11. This surface 174 is in the same plane with the top surface of the bar 171. The oblique surface defined by line m—n in Fig. 11 and designated by numeral 180, carries a small angle plate 181 the lower leg 182 of which is spaced above the surface 174 of the cylindrical part 169 and above the top surface 175 of the bar 171, a distance only to permit the head of a screw A to pass flatwise down along the surfaces 174 and 175. In Figs. 14 and 15 the head of the screw A is represented by the small dot-and-dash rectangle AH. The parts 174, 175 and 182 therefore, provide a gate permitting the screws to pass only flatwise but either head first or point first. Those screws which do not tend to go head first or point first will readily slide down the surfaces 173 and 172 and return to the bottom of the hopper. In case a screw tries to slide sidewise instead of endwise, although flatwise, down the surfaces 174 and 175, it will be caught by a toothed wheel 190 rotating in the direction of the arrow 191 or opposite to that in which the screws descend and such a screw will be ejected from the surfaces 174 and 175 and be returned to the hopper. The toothed wheel 190 is mounted on a shaft 192 journalled in a bearing 193 integral with the hopper 140 and carrying a pulley 194 driven by belt 195 which passes around a driving pulley 196 carried by shaft 157. Pulley 194 is connected also with a pulley 197, and in turn connected by a belt 198 with a pulley 199, which drives a similar screw ejecting device located in the hopper 141. In this way only such screws as will pass flatwise past the gate provided by the parts 174, 175 and 182 in Fig. 14, and 175 and the cylindrical periphery 175x of the wheel 190 are permitted to descend through the chute 142. In a similar way, the screws in the hopper 141 are permitted to pass only flatwise through the chute 143.

*Automatic screw feeding mechanism—device for passing screws point down only*

The selecting device 200 shown in Figs. 16 to 22 inclusive, provides a terminus for the chutes 142 and 143. As the treatment of the screw descending in these chutes to the selecting device is the same with respect to the screws in either of the chutes 142 and 143, the operation of the selecting device will be described only with respect to those screws A which descend through the chute 142. Referring first to Fig. 19, it will be seen that a screw A has descended point first upon a shelf 201 having a shank 202 guided by recess 203 located between the lower end of the chute 142 and a selector frame 204. A spring 205 located in the recess 203 and surrounding a rod 206 urges the shelf 201 upwardly into the position shown in Fig. 19. The rod 206 passes through a plate 207 secured to the lower side of the frame 204 and the lower end of the chute 142. The rod 206 has a head 208, which when striking the lower end of the plate 207, limits upward movement of the shelf 201. The screw A faces toward the right, a passageway shown more clearly in Fig. 18a, between projecting walls 210 and 211, spaced apart sufficiently to permit the threaded shank of the screw to pass through but not the head AH. The walls 210 and 211 do not extend to the ceiling 212 of the passage adjacent to which the passage is enlarged at 213 to permit the head AH to pass through toward the right, as viewed in Fig. 19. The screw A shown in Fig. 19 is caused to turn into the position $A^1$ and finally into the horizontal position $A^2$ shown in Fig. 20, by a sliding bar 220, provided with a pointed end 221 adapted to engage the screw about half way between its ends. When a downwardly pointed screw is engaged by this point 121, the screw will be moved from the position A shown in Fig. 19, to the position $A^2$ shown in Fig. 20 and will be pushed by the shoulder 222 of the slide bar 220 into the chute 148 the entrance to which is provided by a block 223 attached to the terminus of the chute 142.

It will be noted that only one screw is handled at a time by the selecting mechanism. The screws above that one which rests on the shelf 201 are maintained in an elevated position in the chute 142 by a plunger 230 guided by the block 204 and urged by a spring 231 into the chute 142 so as to engage any spring held therein. During the movement of the bar 220 toward the right from the position shown in Fig. 19 to that shown in Fig. 20 for the purpose of moving downwardly pointed screws into the chute 148, the screws which were elevated in the chute 142, as shown in Fig. 19, are permitted to descend so that by the time the slide 220 has arrived at the position shown in Fig. 20, the lower most screw in the chute 142 will rest upon the upper side of the slide 220, the retraction of the clamp 230 is effected during the movement of the slide 220 toward the right. Slide 220 carries with it a bracket 232 to which a stop screw 233 is adjustably secured and locked by a lock nut 234. The screw 233 engages the bar 235 having a recess 236 to receive one end of a lever 237 pivoted at 238 in block 204, having its upper end received by a recess 239 in the clamp bar 230. Therefore, during movement of the slide 220 into the position shown in Fig. 20 the clamp bar 230 will be released to permit the screws in the chute 142 to descend until the lower one rests upon the top of the slide 220. During the next movement of the slide 220 toward the left into the position shown in Fig. 21, the screw 233 will move away from the bar 235 a distance sufficient to permit the spring to press clamp 230 to return into gripping position, as shown in Fig. 21, before the top surface of the slide 220 has cleared the bottom end of the lower most screw in the chute 142. Movement of the slide 220 into the position shown in Fig. 21, permits the lower most screw to descend upon the shelf 221. Suppose that this time the screw upon the shelf 201 is head downward, as shown in Fig. 21. The head AH of the screw A is now located in alignment with the walls 210 and 211 shown in Fig. 18a. Since these walls are spaced apart a distance less than the extreme width of the head AH as viewed in Fig. 18a, the screw A cannot swing in a counter-clockwise direction as did the screw A shown in Fig. 19. Therefore, during movement of the slide 220 toward the right into the position shown in Fig. 22, the point 221 of the slide will cause the screw A, which is head downward, to turn clockwise, as viewed in Fig. 21, falling as indicated at $A^3$ upon the shelf 201. The slide 220 has a beveled camming surface 240 which is adapted to engage a shoulder 241 provided by the shelf 201. The surface 240 begins to engage the shoulder 241 shortly after the screw A has been caused to fall sidewise upon the top of the shelf, this position of the surface 240 being indicated at 240a in Fig. 21. As the camming surface 240 moves from position 240a to 240b in Fig. 22, the shelf 201 is pushed down below the channel 242 so that the screw may be pushed by the slide 220 into the position $A^4$, from whence it is permitted to drop as indicated at $A^5$.

It will be noted that the selecting device operated by the slide 220 causes the screws to be ejected point first into the channel 242 as well as into the chute 148. It is, therefore, apparent that if it were always possible that the screw which came down the chute 142 head first were the same in number as those which come down point first, that a single selecting device could operate to keep two chutes filled leading to the screw and frame assembling device on the head of the punch press. It has been found by experience that about 80% of the screws of the type shown, come down the chute point first, hence, the screws ejected through the channel 242 would be about one fifth the number of screws passed through the chute 148. Hence, it is necessary to have two selecting devices for receiving screws from the chutes 142 and 143 and for filling the chutes 148 and 149 with screws pointing downwardly.

The slides 220 of both selecting devices are attached to a pin 250 to a link 251 pivotally connected at 252 with a stud 253 attached to a lever 254 pivoted at 255 upon a bracket 256 attached to the bracket 151 and carrying a roller 257 bearing against a cam 258 attached to shaft 157. Shaft 157 rotates in the direction of the arrow 259 and the cam 258 causes the slides 220 to move toward the left away from the screw. The slides are actuated by springs 260 toward the chutes so that if any of the screws jam and clog the selecting apparatus, the mechanism will not be injured, since the slides 220 are not positively actuated into selecting position. The springs 260 are attached to the rod 250 and each to a hook screw 261 attached to the selector frame 204.

In the modified form of selecting device shown in Figs. 23 to 29 inclusive, a pusher bar 270 pushes the screws one at a time through a passage 272 and a frame block 271 attached to the frame 204 of the selector. Referring to Fig. 25, the passage 272 includes a portion 272a sufficiently wide to permit passage of the heads of the screws therethrough and a passage 272b located between surfaces 273 and 274 which are spaced apart in amount only slightly in excess of the diameter of the threaded portion of the screw. Below the surfaces 273 and 274, the passage 272c is as wide as the passage 272a. The projecting walls 273 and 274 provide ledges 275 and 276 upon which the head of a screw may ride while being pushed toward the right by the pusher bar 270. Referring to Fig. 26, it will be seen that a screw A has descended point first and rests upon a ledge 277 provided by the frame block 271 as the pusher bar 270 is moved toward the right from the position shown in Fig. 26 to that shown in Fig. 27, it will be caused to move through passage 272, the head of the screw resting upon the ledges 275 and 276, which support any screws which may be placed thereon until they have been pushed into the chute 148a through which they descend point first. Referring to Fig. 27, it will be seen that during movement of the pusher bar 270 toward the right, the latch 230 has released the screws in the chute 142 and that the lower most screw $A^1$ is resting head down upon the upper surface of the bar 270. During the next movement of the bar 270 toward the left into the position shown in Fig. 28, the screw $A^1$ descends into the position $A^2$ while the other screws in the chute 142 are prevented from descending by reason of the engagement of the clamp 230 with the screw next above the screw $A^2$. During movement of the pusher bar 270 toward the right into the position shown in Fig. 29, the screw $A^2$ will be pushed off the ledge 277 and it will fall as indicated by $A^3$ in Fig. 29 through the passage 272c.

For reasons already given, the modified form of selector requires duplex selecting devices each operated by a pusher bar 270. As in the first form of selector, the pusher bars 270 are actuated by springs 260 toward the right and are actuated toward the left by the link 251 which is operated by the cam 258 and lever 254 shown in Fig. 2.

While the form of embodiment of the present invention as herein disclosed, constitutes a preferred form, it is to be understood that other forms might be adopted, all coming within the scope of the claims which follow.

What is claimed is as follows:

1. Apparatus for assembling a screw with a part having a recess for receiving the head of the screw, comprising in combination, a work holder for holding the part, means for locating the screw with its axis parallel to the longer axis of said part and means for pressing the screw sidewise from this parallel position into one in line with the part in which it is to be inserted to cause its head to enter said recess in such a manner that the axis of the screw is coaxial with the longer axis of said part.

2. Apparatus for assembling a screw with a part having a recess for receiving the head of the screw, comprising in combination, a work holder for holding the part, means for locating the screw with its axis parallel to the longer axis of said part, means for pressing a screw sidewise from this parallel position into one in line with the part in which it is to be inserted to cause its head to enter said recess in such manner that the axis of the screw is coaxial with a longer axis of said part and means for feeding screws to said screw pressing means.

3. Apparatus for assembling a screw with a part having a recess for receiving the head of the screw, comprising in combination, a work holder for holding the part, means for locating the screw with its axis parallel to the longer axis of said part, means for pressing a screw sidewise from this parallel position into one in line with the part in which it is to be inserted to cause its head to enter said recess in such manner that the axis of the screw is coaxial with a longer axis of said part and means for ejecting the part from the work holder.

4. Apparatus for assembling a screw with a part having a recess for receiving the head of the screw, comprising in combination, a work holder for holding the part, means for pressing a screw sidewise to cause its head to enter said recess and means for preventing operation of the screw pressing means unless the part is properly located in the work holder.

5. Apparatus for assembling a screw with a part having a recess for receiving the head of the screw, comprising in combination, a work holder for holding the part, means for locating the screw with its axis parallel to the longer axis of said part, means for pressing a screw sidewise from this parallel position into one in line with the part in which it is to be inserted to cause the head to enter said recess in such manner that the axis of the screw is coaxial with a longer axis of said part, means for feeding screws to said screw pressing means, and means for ejecting the part from the work holder.

6. Apparatus for assembling a screw with a part having a recess for receiving the head of the screw, comprising in combination, a work holder for holding the part, means for pressing a screw sidewise to cause its head to enter said recess, means for feeding screws to said screw pressing means, and means for preventing operation of the screw pressing means unless the part is properly located in the work holder.

7. Apparatus for assembling a screw with a part having a recess for receiving the head of the screw, comprising in combination, a work holder for holding the part, means for pressing a screw sidewise to cause its head to enter said recess, means for feeding screws to said screw pressing means, means for ejecting the part from the work holder, and means for preventing operation of the screw pressing means unless the part is properly located in the work holder.

8. Apparatus for assembling a screw with a part having a recess for receiving the head of the screw, comprising in combination with a punch press having a horizontal bed and a vertically movable head, a work holder mounted on the bed for holding the part, and means operated by the punch press head for pressing a screw sidewise to cause its head to enter said recess.

9. Apparatus for assembling a screw with a part having a recess for receiving the head of the screw, comprising in combination with a punch press having a horizontal bed and a vertically movable head, a work holder mounted on the bed for holding the part, means operated by the punch press head for pressing a screw sidewise to cause its head to enter said recess, and means for feeding screws to said screw pressing means.

10. Apparatus for assembling a screw with a part having a recess for receiving the head of the screw, comprising in combination with a punch press having a horizontal bed and a vertically movable head, a work holder mounted on the bed for holding the part, means operated by the punch press head for pressing a screw sidewise to cause its head to enter said recess, and means operated by the punch press head for ejecting the part from the work holder.

11. Apparatus for assembling a screw with a part having a recess for receiving the head of the screw, comprising in combination with a punch press having a horizontal bed and a vertically movable head, a work holder mounted on the bed for holding the part, means operated by the punch press head for pressing a screw sidewise to cause its head to enter said recess, and means for preventing the operation of the punch press unless the part is properly located in the work holder.

12. Apparatus for assembling a screw with a part having a recess for receiving the head of the screw, comprising in combination with a punch press having a horizontal bed and a vertically movable head, a work holder mounted on the bed for holding the part, means operated by the punch press head for pressing a screw sidewise to cause its head to enter said recess, means for feeding screws to said screw pressing means, and means operated by the punch press head for ejecting the part from the work holder.

13. Apparatus for assembling a screw with a part having a recess for receiving the head of the screw, comprising in combination with a punch press having a horizontal bed and a vertically movable head, a work holder mounted on the bed for holding the part, means operated by the punch press head for pressing a screw sidewise to cause its head to enter said recess, means for feeding screws to said screw pressing means, and means for preventing the operation of the punch press unless the part is properly located in the work holder.

14. Apparatus for assembling a screw with a part having a recess for receiving the head of the screw, comprising in combination with a punch press having a horizontal bed and a vertically movable head, a work holder mounted on the bed for holding the part, means operated by the punch press head for pressing a screw sidewise to cause its head to enter said recess, means for feeding screws to said screw pressing means, means operated by the punch press head for ejecting the part from the work holder, and means for preventing the operation of the punch press unless the part is properly located in the work holder.

15. Apparatus for assembling a screw with a part having a recess for receiving the head of the screw, comprising in combination, a part holding means, means for positioning the screw adjacent the part so that sidewise movement of the screw will cause its head to be received by the part, means for pressing the screw into the recess of said part, and means for feeding screws to said screw positioning means, said feeding means comprising a screw containing hopper, a delivery chute and means for permitting screws which point in a certain direction only to pass down the chute to the screw positioning means.

16. Apparatus according to claim 15 further characterized by having means for ejecting screws which do not point in a certain direction as they pass through the chute.

17. Apparatus according to claim 15 further characterized by having means for permitting screws which point downwardly only to pass down the chute to the screw positioning means.

18. Apparatus according to claim 15 further characterized by having means for permitting screws which point downwardly only to pass down the chute to the screw positioning means and by having means for ejecting screws which point upwardly as they pass through the chute.

19. Apparatus for assembling a screw, having a laterally flattened head having a width dimension greater than its thickness, with a part having a recess adapted to receive the head of the screw, comprising in combination, a work holder for receiving the part, means for locating a screw with its head in lateral alignment with the recess of said part, means for pressing the screw head laterally into said recess, and means for feeding screws to the screw locating means and comprising a delivery chute, a screw containing hopper, means for causing screws to pass flatwise only to the chute and means for permitting to pass through the chute to the screw locating means only such screws as point in a certain direction.

In testimony whereof we hereto affix our signatures.

ALVA W. PHELPS.
NORMAN L. PENN.